UNITED STATES PATENT OFFICE.

CARL MÜLLER, OF BIEBRICH-ON-THE-RHINE, GERMANY, ASSIGNOR TO THE FIRM OF KALLE AND COMPANY, AKTIENGESELLSCHAFT, OF BIEBRICH-ON-THE-RHINE, GERMANY.

MANUFACTURE OF AN AZO DYESTUFF WHICH MAY BE DEVELOPED ON THE FIBER.

1,113,468.   Specification of Letters Patent.   Patented Oct. 13, 1914.

No Drawing.   Application filed November 13, 1913.   Serial No. 800,876.

*To all whom it may concern:*

Be it known that I, CARL MÜLLER, a citizen of the German Empire, and resident of Biebrich-on-the-Rhine, Germany, have invented certain new and useful Improvements in the Manufacture of an Azo Dyestuff Which May be Developed on the Fiber, of which the following is a specification.

I have found that by combining the 1-diazonaphthalene-2-sulfonic acid with α-naphthylamin, diazotizing the obtained product and coupling it with 2-amino-5-oxynaphthalene-7-sulfonic acid, a coloring matter can be produced, which, when diazotized on the cotton fiber and coupled with a naphthol gives valuable shades fast to washing and light.

To obtain the described coloring matter, I proceed as follows, the parts being by weight.

Example 1: 4.5 parts of the sodium salt of 1-amino-naphthalene-2-sulfonic acid are dissolved in water and diazotized in the usual manner with nitrite of sodium and hydrochloric acid. To the obtained diazo compound are added 14.3 parts of alpha-naphthylamin dissolved in water and hydrochloric acid. A suitable quantity of calcium carbonate is added during the reaction for the purpose of removing the excess of acid. After the coupling is finished the mono-azo dyestuff is filtered off and washed. It is then transformed into the sodium salt, diazotized with sodium nitrite and hydrochloric acid and the diazo compound filtered off and washed. The diazo compound is stirred up with cold water and introduced into 24 parts of 2-amino-5-oxynaphthalene-7-sulfonic acid, dissolved in cold water with the addition of soda. The obtained product is filtered off, washed and dried. In the form of the free acid it has a formula graphically represented as follows:

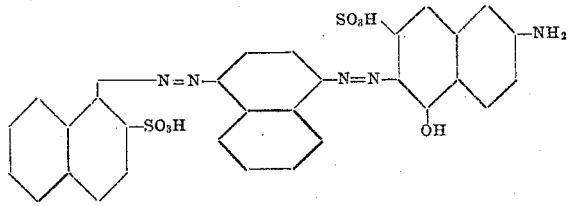

The process of dyeing is carried out in the manner usually employed for dyestuffs capable of being diazotized and developed.

Example 2: The cotton dyed with the above described coloring matter is carried through a bath consisting of a solution of nitrous acid. After the original shade has disappeared, the goods are passed through an alkaline bath of sodium beta-naphtholate, until the coupling is completed. The shade thus obtained is a blue, fast to washing, whereas the original shade is a violet not fast to washing. By substituting the 1-amino-naphthalene-2-sulfonic acid in the first place by other usual components one obtains dyestuffs which do not possess a similar fastness to washing simultaneously with the same good fastness to light, even after they have been developed with β-naphthol.

I claim:

1. Process for producing an azo-dyestuff which after being developed on the fiber gives shades fast to washing and light, consisting in coupling 1-diazo-naphthalene-2-sulfonic acid with alpha-naphthylamin, diazotizing the obtained product and combining it with 2-amino-5-oxynaphthalene-7-sulfonic acid.

2. As a new product the alkali salt of the disazo-dyestuff of the following formula:

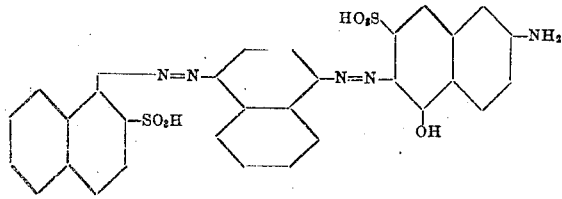

obtainable by combining 1-diazo-naphthalene-2-sulfonic acid with alpha-naphthylamin, diazotizing and coupling in an alkaline solution, with 2-amino-5-oxy-naphthalene-7-sulfonic acid; being a bronze-like powder, soluble in water with a red-violet color, from which solution acids precipitate the acid of the dyestuff in form of violet flakes, alkali hydroxid turning the color of the solution to blue and precipitating the alkali salt of the dyestuff; soluble in alcohol with a cherry-red; in sulfuric acid with a bluish-black color insoluble in ether and practically insoluble in benzene.

In testimony whereof I have signed my name to this specification in the presence of two subscribing witnesses.

CARL MÜLLER.

Witnesses:
 OTTO KEMPF,
 FRITZ KICTROCIN.